(12) United States Patent
    Zhang et al.

(10) Patent No.: US 12,638,081 B2
(45) Date of Patent: May 26, 2026

(54) SEALING DEVICE AND MANUFACTURING METHOD THEREFOR

(71) Applicant: Schaeffler Technologies AG & Co. KG, Herzogenaurach (DE)

(72) Inventors: Yuelin Zhang, Taicang (CN); Xin Liu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/684,865

(22) PCT Filed: Jun. 30, 2022

(86) PCT No.: PCT/CN2022/103066
    § 371 (c)(1),
    (2) Date: Feb. 20, 2024

(87) PCT Pub. No.: WO2023/040418
    PCT Pub. Date: Mar. 23, 2023

(65) Prior Publication Data
    US 2024/0426378 A1      Dec. 26, 2024

(30) Foreign Application Priority Data

Sep. 16, 2021    (CN) .......................... 202111085416.4

(51) Int. Cl.
    *F16J 15/3204*        (2016.01)
(52) U.S. Cl.
    CPC ................................. *F16J 15/3204* (2013.01)

(58) Field of Classification Search
    CPC ...... F16J 15/32; F16J 15/3204; F16J 15/3232; F16J 15/3284; F16J 15/3236;
    (Continued)

(56) References Cited

U.S. PATENT DOCUMENTS

| | | | |
|---|---|---|---|
| 3,235,636 A * | 2/1966 | Trimble | B29C 35/0233 |
| | | | 264/572 |
| 3,521,890 A | 7/1970 | Holmes | |

(Continued)

FOREIGN PATENT DOCUMENTS

| | | | |
|---|---|---|---|
| CN | 207864626 U | * | 9/2018 |
| CN | 110307341 A | | 10/2019 |

(Continued)

OTHER PUBLICATIONS

International Search report regarding International Application No. PCT/CN2022/103066, issued Sep. 27, 2022, and English translation.

(Continued)

*Primary Examiner* — Nathan Cumar

(57) ABSTRACT

A sealing device includes an annular elastic seal body and a rigid annular member, and the elastic seal body is fixed to the rigid annular member. The elastic seal body includes a base and at least one seal lip, and the seal lip extends from the base in a direction away from the base. The seal lip includes a foamed layer formed on a surface thereof. The foamed layer has a plurality of foam structures, and the seal lip also includes a wear-resistant coating formed on the foamed layer. A manufacturing method for a sealing device is also disclosed.

18 Claims, 3 Drawing Sheets

(58) Field of Classification Search
CPC .... F16J 15/324; F16J 15/3244; F16J 15/3264;
F16J 15/3268; B29C 44/0461; B29C
44/06; B29C 44/12; B29C 44/1271; B29L
2031/006
USPC .......................................................... 277/560
See application file for complete search history.

(56) References Cited

U.S. PATENT DOCUMENTS

| | | | | | |
|---|---|---|---|---|---|
| 5,910,277 | A | * | 6/1999 | Ishino | B32B 27/12 264/154 |
| 8,481,155 | B2 | * | 7/2013 | Iwase | C08J 3/243 521/142 |
| 8,728,372 | B2 | * | 5/2014 | Humphrey | B29C 55/005 264/211.13 |
| 9,156,227 | B2 | * | 10/2015 | McCoy | B29C 44/321 |
| 9,572,654 | B2 | * | 2/2017 | Edwin | A61L 27/507 |
| 9,845,880 | B2 | | 12/2017 | Mueller-Niehuus | |
| 2004/0113366 | A1 | * | 6/2004 | Mause | F16C 33/7859 277/394 |
| 2005/0151322 | A1 | * | 7/2005 | Kobayashi | F16J 15/3228 277/309 |
| 2008/0100003 | A1 | | 5/2008 | Vance | |
| 2019/0211700 | A1 | * | 7/2019 | Munson | F16J 15/3284 |

FOREIGN PATENT DOCUMENTS

| | | | | | |
|---|---|---|---|---|---|
| CN | 214999393 | U | | 12/2021 | |
| CN | 216742782 | U | | 6/2022 | |
| DE | 102008039805 | A1 | | 2/2010 | |
| DE | 102012001226 | A1 | * | 7/2013 | F16J 15/3228 |
| EP | 2290269 | B1 | * | 7/2016 | F16J 15/324 |
| JP | 58191372 | A | | 11/1983 | |
| JP | 2002187431 | A | | 7/2002 | |
| JP | 3838562 | B2 | * | 10/2006 | |
| JP | 2018112235 | A | | 7/2018 | |
| WO | 2012152808 | A1 | | 11/2012 | |
| WO | WO-2012168354 | A1 | * | 12/2012 | C08J 7/047 |

OTHER PUBLICATIONS

European Patent Office Supplemental European Search Report, Jun. 10, 2025, for counterpart EPO application EP4403803.

* cited by examiner

SEALING DEVICE AND MANUFACTURING METHOD THEREFOR

CROSS-REFERENCE TO RELATED APPLICATIONS

This application is the United States National Phase of PCT Appln. No. PCT/CN2022/103066 filed Jun. 30, 2022, which claims priority to Chinese Application No. CN202111085416.4 filed Sep. 16, 2021, the entire disclosures of which are incorporated by reference herein.

TECHNICAL FIELD

The present disclosure relates to the technical field of sealing. In particular, the present disclosure relates to a sealing device for dynamic sealing and a manufacturing method for the sealing device.

BACKGROUND

Sealing devices are needed to be installed in rotating components of many machines. Especially, in the field of wheel bearings of vehicles, dynamic sealing with high sealing performance and low friction torque are required. These sealing devices are usually in an annular shape and comprise rigid annular members and elastic seal bodies. The rigid annular members are made of metal materials, so as to be fixed to the rotating components on radial outer sides in a tight fit (or known as interference fit) manner. The elastic seal bodies are fixed to the rigid annular members and extend out to form one or more seal lips. Wear-resistant materials, such as polytetrafluoroethylene (PTFE), are coated on surfaces of the seal lips.

In the working process of bearings, the coated wear-resistant coatings are prone to fall off from the surfaces of the seal lips, causing the reduced working efficiency and the lowered sealing performance of the bearings. Therefore, how to bond the wear-resistant coatings and the seal lips reliably and stably is very important for the working efficiency of the bearings and the safety of entire vehicles.

SUMMARY

The present disclosure provides a sealing device and a manufacturing method therefor.

In a first aspect, embodiments of the present disclosure provide a sealing device, including an annular elastic seal body and a rigid annular member, wherein the elastic seal body is fixed to the rigid annular member. The elastic seal body includes a base and at least one seal lip, and the seal lip extends from the base in a direction away from the base. The seal lip includes a foamed layer formed on a surface thereof, the foamed layer has a plurality of foam structures, and the seal lip also includes a wear-resistant coating formed on the foamed layer.

According to one embodiment, the sealing device also includes an oil retainer, the oil retainer and the rigid annular member are disposed oppositely in an axial direction, and the oil retainer and the rigid annular member are relatively rotatable around a rotation axis. One end, away from the base, of the seal lip is in sealing fit with the oil retainer.

According to one embodiment, the rigid annular member includes an annular member axial segment and an annular member radial segment, and the oil retainer includes an oil retainer axial segment and an oil retainer radial segment. The annular member axial segment and the oil retainer axial segment are disposed oppositely in a radial direction, the annular member radial segment and the oil retainer radial segment are disposed oppositely in the axial direction, and the rigid annular member and the oil retainer form a chamber structure.

According to one embodiment, the seal lip includes a main seal lip and a centrifugal seal lip. The main seal lip is in sealing fit with the oil retainer axial segment, and the centrifugal seal lip is in sealing fit with the oil retainer radial segment.

According to one embodiment, the foam structures are convex structures protruding from the surface of the seal lip, or the foam structures are hole structures recessed in the surface of the seal lip.

According to one embodiment, the seal lip and the foamed layer are integrally formed.

According to one embodiment, the base and the seal lip are integrally formed.

According to one embodiment, the wear-resistant coating is made of polytetrafluoroethylene (PTFE) materials.

According to one embodiment, the elastic seal body is made of rubber materials.

In a second aspect, embodiments of the present disclosure provide a manufacturing method for a sealing device. The sealing device includes an annular elastic seal body and a rigid annular member, and the elastic seal body is fixed to the rigid annular member. The elastic seal body includes a base and at least one seal lip, and the seal lip extends from the base in a direction away from the base. The seal lip includes a foamed layer formed on a surface thereof, the foamed layer has a plurality of foam structures, and the seal lip also includes a wear-resistant coating formed on the foamed layer. The method includes vulcanizing the elastic seal body, wherein the surface of the seal lip is foamed by spraying a foaming agent on an inner surface of a mold, thereby forming the foamed layer; and forming the wear-resistant coating by applying a wear-resistant paint on the foamed layer.

According to the sealing device and the manufacturing method therefor provided by the embodiments of the present disclosure, by means of vulcanizing the elastic seal body, wherein the surface of the seal lip is foamed by spraying the foaming agent to the surface of the mold, thereby forming the foamed layer, foamed rubber thus has characteristics of soft porous or multi-foam structures. When a wear-resistant paint is applied on the foamed layer, such soft porous or multi-foam structures can absorb and store wear-resistant materials to enable two materials to well mix and permeate, thereby improving the binding performance between the elastic seal body and the wear-resistant coating, and further making the binding between the elastic seal body and the wear-resistant coating more stable and reliable, so as to guarantee that the sealing device has a better sealing performance, a lower friction torque, and a longer service life.

BRIEF DESCRIPTION OF THE DRAWINGS

In order to explain the embodiments of the present disclosure more clearly, the accompanying drawings used in the description of the embodiments will be briefly introduced below. Obviously, the accompanying drawings in the following description are only some embodiments, and for those of ordinary skill in the art, other accompanying drawings can also be obtained based on these accompanying drawings without exerting creative efforts. In the figures.

DETAILED DESCRIPTION

In order to make purposes, technical solutions and advantages of the embodiments of the present disclosure clearer, the technical solutions of the embodiments of the present disclosure will be described below in conjunction with the accompanying drawings of the embodiments of the present disclosure. Obviously, the described embodiments are some, but not all, of the embodiments of the present disclosure. Based on the described embodiments of the present disclosure, all other embodiments obtained by those of ordinary skill in the art fall within the scope of protection of the present disclosure.

According to an embodiment of the present disclosure, provided is a sealing device. Such sealing device is used for sealing between various rotating components that need to be sealed. For example, it can be installed between an outer ring and an inner ring of a bearing, or installed between a bearing and a rotating shaft. The sealing device can seal, for example, lubricating oil and the like inside, and block contaminants such as muddy water outside.

Figure 1:
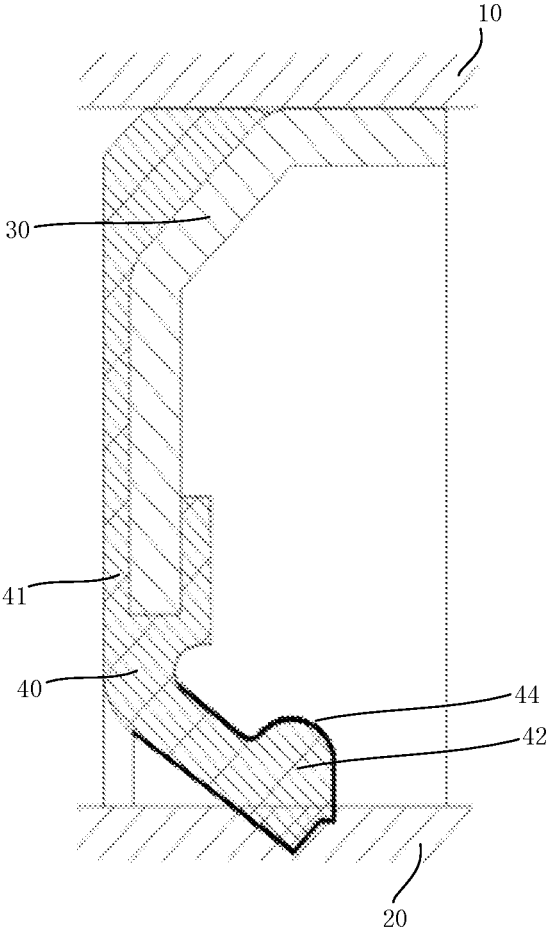
FIG. 1 shows a partial sectional view of a sealing device according to an embodiment of the present disclosure.

FIG. 1 shows a partial sectional view of the sealing device according to the embodiment. The sealing device is in an annular shape as a whole. Shown in FIG. 1 is a representative part of a section passing through a central axis of the annular shape. As shown in FIG. 1, the sealing device is installed in an annular space between two sealed parts. In the present embodiment, the two sealed parts may be, for example, an outer ring 10 and an inner ring 20 of a bearing. The outer ring 10 and the inner ring 20 are basically arranged around a common rotation axis and can relatively rotate around the rotation axis, wherein the outer ring 10 is located on a radial outer side of the inner ring 20. The central axis of the sealing device is arranged basically coincident with the rotation axis of the bearing.

As shown in FIG. 1, the sealing device may include a rigid annular member 30 and an annular elastic seal body 40. The rigid annular member 30 and the elastic seal body 40 are coaxially disposed around the rotation axis. The elastic seal body 40 is fixed to the rigid annular member 30.

The rigid annular member 30 may be made of plastic materials. The plastic materials here may be various plastics having suitable mechanical properties, for example, PA 66. On one hand, the plastic materials have sufficient stiffness to provide structural supporting for the elastic seal body 40; and on the other hand, the plastic materials are low-cost and easy to process, for example, various required shapes can be conveniently formed through injection molding. Furthermore, the rigid annular member 30 may also be made of metal materials. In the present embodiment, the rigid annular member 30 may be fixed to a radial inner side of the outer ring 10 in, for example, an interference fit manner, thereby being able to rotate together with the outer ring 10 relative to the inner ring 20.

The elastic seal body 40 may be made of elastic materials such as rubber. The elastic seal body 40 includes a base 41 and at least one seal lip 42. The seal lip 42 extends from the base 41 in a direction away from the base 41. The seal lip 42 of the elastic seal body 40 is an annular structure around the rotation axis. The base 41 and the seal lip 42 may be integrally formed. In the embodiment shown in FIG. 1, one seal lip 42 is schematically shown. In an installed state, the seal lip 42 extends toward the inner ring 20 on the radial inner side and contacts an outer surface of the inner ring 20 to form sealing fit. The elastic seal body 40 together with the rigid annular member 30 fixed thereto may rotate along with the outer ring 10 relative to the inner ring 20, thereby enabling the sealing device to dynamically seal an annular gap between the outer ring 10 and the inner ring 20.

Figure 2A:
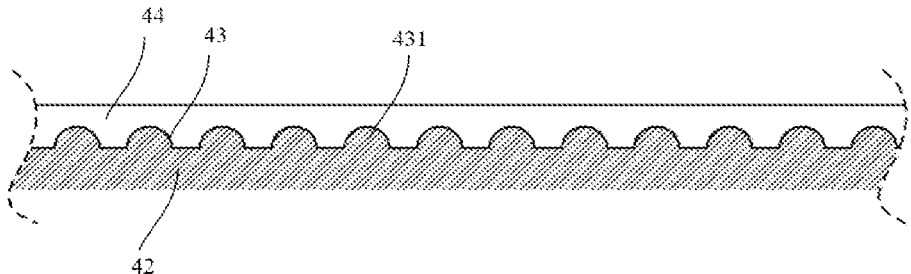
FIG. 2A shows a partial sectional view of a seal lip according to an embodiment of the present disclosure.
Figure 2B:
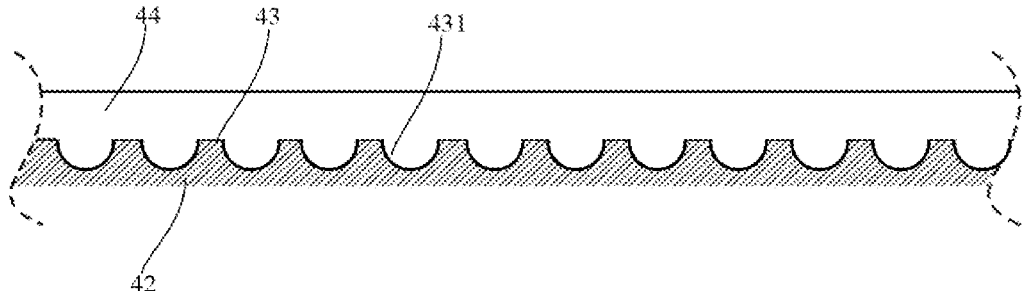
FIG. 2B shows a partial sectional view of a seal lip according to another embodiment of the present disclosure.
Figure 3:
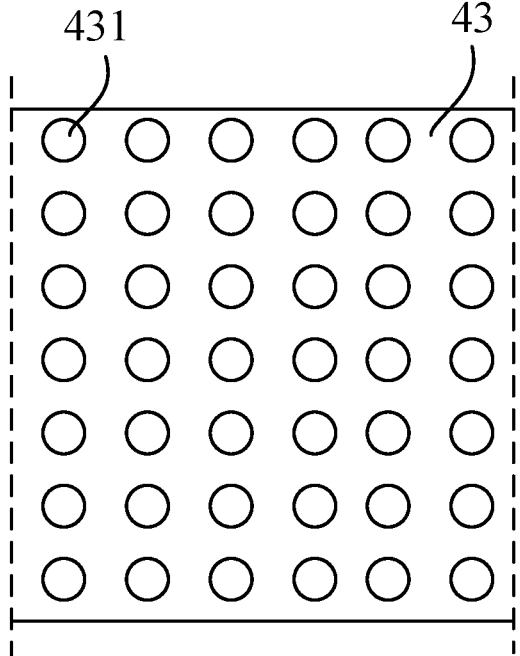
FIG. 3 shows a partial top view of a foamed layer according to an embodiment of the present disclosure.

Further, in conjunction with FIG. 1 to FIG. 3, the seal lip 42 also includes a foamed layer 43 formed on a surface thereof, and the foamed layer 43 has a plurality of foam structures 431. In the process of vulcanizing the elastic seal body 40, a foaming agent is sprayed to an inner surface of a vulcanization mold to form a plurality of foam structures 431 on the surface of the seal lip 42, thereby forming the foamed layer 43. The seal lip 42 and the foamed layer 43 may be integrally formed.

Specifically, FIG. 2A shows a partial sectional view of the seal lip 42 according to an embodiment of the present disclosure. The foam structures 431 are convex structures protruding from the surface of the seal lip 42. It should be understood that FIG. 2A only exemplarily shows that the plurality of foam structures 431 are distributed on the surface of the seal lip 42, and the plurality of foam structures 431 may be of unequal size, and the plurality of foam structures 431 may be unevenly and randomly distributed on the surface of the seal lip 42.

FIG. 2B shows a partial sectional view of the seal lip 42 according to another embodiment of the present disclosure. The foam structures 431 are hole structures recessed in the surface of the seal lip 42. It should be understood that FIG. 2B only exemplarily shows that the plurality of foam structures 431 are distributed on the surface of the seal lip 42, and the plurality of foam structures 431 may be of unequal size, and the plurality of foam structures 431 may be unevenly and randomly distributed on the surface of the seal lip 42.

FIG. 3 shows a partial top view of the foamed layer 43 according to an embodiment of the present disclosure. The plurality of foam structures 431 are distributed on the surface of the seal lip 42 to form the foamed layer 43. It should be understood that FIG. 3 only exemplarily shows that the plurality of foam structures 431 are distributed on the surface of the seal lip 42, and the plurality of foam structures 431 may be of unequal size, and the plurality of foam structures 431 may be unevenly and randomly distributed on the surface of the seal lip 42.

Further, referring to FIG. 2A and FIG. 2B, the seal lip 42 also includes a wear-resistant coating 44 formed on the foamed layer 43. A wear-resistant paint is applied on the foamed layer 43 to form the wear-resistant coating 44. The wear-resistant paint may be polytetrafluoroethylene (PTFE). The PTFE has good wear resistance and can reduce the friction coefficient and friction torque on the surface of the seal lip 42 and improve the sealing performance of the sealing device.

In the embodiment as shown in FIG. 2A, a portion of the wear-resistant coating 44 is among a plurality of foam structures 431 being convex structures, or, in another embodiment as shown in FIG. 2B, a portion of the wear-resistant coating 44 enters a plurality of foam structures 431 being hole structures, enabling the wear-resistant paint and the surface of the seal lip 42 to fully mix and permeate, thereby improving the binding performance between the elastic seal body and the wear-resistant coating, and further making the binding between the elastic seal body and the wear-resistant coating more stable and reliable.

Figure 4:
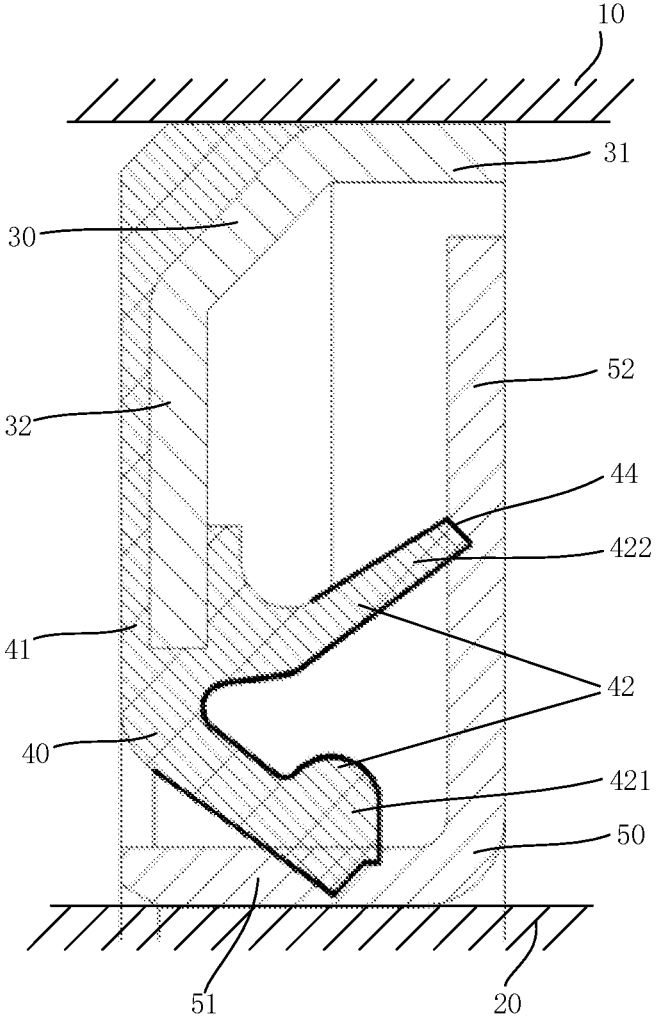
FIG. 4 shows a partial sectional view of a sealing device according to another embodiment of the present disclosure.

Optionally, FIG. 4 shows a partial sectional view of a sealing device according to another embodiment of the present disclosure. The sealing device may also include an oil retainer 50. The oil retainer 50 may be fixed to a radial outer side of the inner ring 20 in, for example, an interference fit manner, the oil retainer 50 and the rigid annular member 30 are substantially disposed oppositely in an axial direction, and the oil retainer 50 is rotatable around the rotation axis relative to the rigid annular member 30. The oil retainer 50 may be made of rigid materials, such as plastic materials or metal materials. The plastic materials here may also be various plastics having suitable mechanical properties, for example, PA 66. In addition, one end, away from the base 41, of the seal lip 42 may be in sealing fit with the oil retainer 50.

Further, the rigid annular member 30 includes an annular member axial segment 31 generally extending along the axial direction and an annular member radial segment 32 generally extending along the radial direction. The annular member axial segment 31 is used for fixing the rigid annular member 30 to the radial inner side of the outer ring 10, and the annular member radial segment 32 is used for fixing the base 41 of the elastic seal body 40. The oil retainer 50 includes an oil retainer axial segment 51 generally extending along the axial direction and an oil retainer radial segment 52 generally extending along the radial direction, and the oil retainer axial segment 51 is used for fixing the oil retainer 50 to the radial outer side of the inner ring 20. The annular member axial segment 31 and the oil retainer axial segment 51 are disposed oppositely in the radial direction, the annular member radial segment 32 and the oil retainer radial segment 52 are disposed oppositely in the axial direction, and the rigid annular member 30 and the oil retainer 50 form a chamber structure.

In addition, one end, away from the base 41, of the at least one seal lip 42 may be in sealing fit with the oil retainer axial segment 51 and/or the oil retainer radial segment 52. In the present embodiment, as shown in FIG. 4, the seal lip 42 includes a main seal lip 421 and a centrifugal seal lip 422. The main seal lip 421 is in sealing fit with the oil retainer axial segment 51, and the centrifugal seal lip 422 is in sealing fit with the oil retainer radial segment 52. However, this is only illustrative. The elastic seal body 40 may also have more or less seal lips, and these seal lips may also have different extending directions.

According to an embodiment of the present disclosure, provided is a manufacturing method for a sealing device. The method is used for manufacturing the sealing device as described above. The method includes:

vulcanizing the elastic seal body 40, wherein a surface of a seal lip 42 is foamed by spraying a foaming agent on an inner surface of a mold, thereby forming a foamed layer 43; and applying a wear-resistant paint on the foamed layer 43 to form the wear-resistant coating 44.

The foaming agent may be an organic foaming agent such as azodicarbonamide (AC), p-toluenesulfonhydrazide (TSH), or an inorganic foaming agent such as sodium bicarbonate.

By vulcanizing the elastic seal body 40 made of rubber materials, the elastic seal body 40 can have higher elasticity, heat resistance and tensile strength, and can be insoluble in organic solvents. By spraying the foaming agent on the inner surface of the mold, the elastic seal body 40 may be softer and have a plurality of foam structures 431, and thus further absorb and store wear-resistant materials, enabling two materials to well mix and permeate, thereby improving the binding performance between the elastic seal body and wear-resistant coating, and further making the binding between the elastic seal body and the wear-resistant coating more stable and reliable, so as to guarantee that the sealing device has a better sealing performance, a lower friction torque, and a longer service life.

It should be noted that the present disclosure aims to improve the wear-resistant coating on the surface of the seal lip in the sealing device and the manufacturing method for the sealing device. Therefore, the technical solutions of the present disclosure may be applied to various sealing devices and are not limited to particular components of specific sealing devices shown in the embodiments. For a sealing device having a plurality of seal lips, the above improvements may be made to all of the seal lips, or to only one or some of the seal lips; and for each seal lip, the above improvements may be made to the entire surface of the seal lip, or to a partial surface of the seal lip, for example, the portions, in contact with the sealed part or the oil retainer 50, of the surface of the seal lip. In addition, the present disclosure may also be applied to other sealing devices which are in a non-annular structure and used for dynamic sealing.

Although possible embodiments have been described illustratively in the above description, it should be understood that there are still a large number of embodiment variations through combinations of all known technical features and embodiments as well as those are readily apparent to those skilled in the art. In addition, it should be further understood that the exemplary embodiments are just examples and shall not in any way limit the scope of protection, application and construction of the present disclosure. The foregoing description is more intended to provide those skilled in the art with a technical guide for converting at least one exemplary embodiment, in which various changes, especially changes in the functions and structures of the components, can be made as long as they do not depart from the scope of protection of the claims.

Reference Numerals

10 Outer ring
20 Inner ring
30 Rigid annular member
31 Annular member axial segment
32 Annular member radial segment
40 Elastic seal body
41 Base
42 Seal lip
421 Main seal lip
422 Centrifugal seal lip
43 Foamed layer
431 Foam structure
44 Wear-resistant coating
50 Oil retainer
51 Oil retainer axial segment
52 Oil retainer radial segment

The invention claimed is:
1. A sealing device, comprising:
an annular elastic seal body and a rigid annular member, the elastic seal body being fixed to the rigid annular member,

wherein the elastic seal body comprises a base and at least one seal lip, the at least one seal lip extends from the base in a direction away from the base; and wherein the seal lip comprises a foamed layer formed on a surface thereof, the foamed layer has a plurality of foam structures, and the seal lip further comprises a wear-resistant coating formed directly on the foamed layer.

2. The sealing device according to claim 1, wherein:

the sealing device further comprises an oil retainer;

the oil retainer and the rigid annular member are disposed oppositely in an axial direction, and the oil retainer and the rigid annular member are relatively rotatable around a rotation axis; and one end, away from the base, of the seal lip is in sealing fit with the oil retainer.

3. The sealing device according to claim 2, wherein:

the rigid annular member comprises an annular member axial segment and an annular member radial segment, and the oil retainer comprises an oil retainer axial segment and an oil retainer radial segment; and the annular member axial segment and the oil retainer axial segment are disposed oppositely in a radial direction, the annular member radial segment and the oil retainer radial segment are disposed oppositely in the axial direction, and the rigid annular member and the oil retainer form a chamber structure.

4. The sealing device according to claim 3, wherein:

the seal lip comprises a main seal lip and a centrifugal seal lip; and the main seal lip is in sealing fit with the oil retainer axial segment, and the centrifugal seal lip is in sealing fit with the oil retainer radial segment.

5. The sealing device according to claim 1, wherein:

the foam structures are convex structures protruding from the surface of the seal lip; or the foam structures are hole structures recessed in the surface of the seal lip.

6. The sealing device according to claim 1, wherein the seal lip and the foamed layer are integrally formed.

7. The sealing device according to claim 1, wherein the base and the seal lip are integrally formed.

8. The sealing device according to claim 1, wherein the wear-resistant coating comprises polytetrafluoroethylene (PTFE) materials.

9. The sealing device according to claim 1, wherein the elastic seal body is made of rubber materials.

10. A manufacturing method for a sealing device, wherein:

the sealing device comprises an annular elastic seal body and a rigid annular member, the elastic seal body is fixed to the rigid annular member, the elastic seal body comprises a base and at least one seal lip, and the seal lip extends from the base in a direction away from the base; and the seal lip comprises a foamed layer formed on a surface thereof, the foamed layer has a plurality of foam structures, and the seal lip further comprises a wear-resistant coating formed on the foamed layer; the method comprises:

vulcanizing the elastic seal body, wherein the surface of the seal lip is foamed by spraying a foaming agent on an inner surface of a mold, thereby forming the foamed layer; and forming the wear-resistant coating by applying a wear-resistant paint directly on the foamed layer.

11. The manufacturing method according to claim 10, wherein the foaming agent comprises an organic foaming agent.

12. The manufacturing method according to claim 11, wherein the organic foaming agent comprises p-toluene-sulfonhydrazide.

13. The manufacturing method according to claim 10, wherein the foamed layer is integrally formed as part of the vulcanized at least one seal lip.

14. The manufacturing method according to claim 10, wherein the foamed layer comprises a foamed rubber layer.

15. The manufacturing method according to claim 14, wherein the foamed rubber layer has a soft porous structure.

16. The sealing device according to claim 1, wherein the foamed layer is integrally formed as part of the at least one seal lip.

17. The sealing device according to claim 1, wherein the foamed layer comprises a foamed rubber layer.

18. The sealing device according to claim 17, wherein the foamed rubber layer has a soft porous structure.

* * * * *